United States Patent [19]

Mues et al.

[11] Patent Number: 4,707,539

[45] Date of Patent: Nov. 17, 1987

[54] PROCESS FOR THE PREPARATION OF THERMOSETTING ALIPHATIC POLYCARBONATE WITH QUATERNARY SALT CATALYST

[75] Inventors: Peter Mues, Duisburg; Dimitrios Kerimis, Cologne; Hanns P. Müller, Odenthal; Hans-Josef Buysch, Krefeld, all of Fed. Rep. of Germany

[73] Assignee: Bayer Aktiengesellschaft, Leverkusen-Bayerwerk, Fed. Rep. of Germany

[21] Appl. No.: 875,602

[22] Filed: Jun. 18, 1986

[30] Foreign Application Priority Data

Jun. 29, 1985 [DE] Fed. Rep. of Germany ....... 3523399

[51] Int. Cl.⁴ .............................................. C08G 63/62

[52] U.S. Cl. .................................... 528/371; 528/196; 528/370

[58] Field of Search ................................ 528/371, 370

[56] References Cited

U.S. PATENT DOCUMENTS 3,442,854  5/1969  Curtius et al. ........................ 260/47
4,568,755  2/1986  Mues et al. .......................... 528/370

Primary Examiner—Harold D. Anderson
Attorney, Agent, or Firm—Connolly and Hutz

[57] ABSTRACT

The invention relates to a new process for the preparation of thermosetting aliphatic polycarbonates from cyclic aliphatic carbonic acid ester by ring-opening polymerization.

4 Claims, No Drawings

PROCESS FOR THE PREPARATION OF THERMOSETTING ALIPHATIC POLYCARBONATE WITH QUATERNARY SALT CATALYST

The invention relates to a new process for the preparation of thermosetting aliphatic polycarbonates from cyclic aliphatic carbonic acid esters by ring-opening polymerization.

It is known that cyclic carbonates can be polymerized by compounds which have an alkaline reaction, for example potassium carbonate, at elevated temperature (130° C.) (J. Am. Chem. Soc. 52, 314 (1930)).

Alkali metal compounds and metal alcoholates and amides are mentioned in DE-OS (German Published Specification) Nos. 1,545,116, 1,545,117 and 1,545,118 as particularly suitable catalysts for this reaction, which can already be used at low temperatures (about 90° C.).

These catalysts are unsuitable for the preparation of thermosetting aliphatic polycarbonates by ring-opening copolymerization of mono- and bifunctional, that is to say crosslinking, cyclic carbonates, since they lead to the formation of multi-phase systems which trigger off either no polymerization or only uncontrolled polymerization. Non-reproducible polymerizations and non-uniformly polymerized products are the result. In other cases, only products containing bubbles are formed, as a result of severe splitting off of $CO_2$ during the polymerization.

DE-OS (German Published Specification) Nos. 3,103,135 and 3,204,078 describe the use of thallium compounds, which have an alkaline reaction, for the polymerization of cyclic carbonates. These catalysts can be used only to a very limited degree for the preparation of thermosetting products, since here also the polymerization does not proceed reproducibly in all cases. A particular disadvantage is, however, that no polymerization proceeds with this TL compound in the presence of the customary fillers and reinforcing materials for thermosetting resins, for example quartz sand and glass fibres.

It was therefore desirable to develop a process which permits reproducible preparation of thermosetting resins, including reinforced thermosetting resins, by ring-opening polymerization of cyclic carbonic acid esters.

A process has now been found which allows the preparation of thermosetting, optionally reinforced aliphatic polycarbonates by ring-opening copolymerization of monocyclic carbonates and bifunctional cyclic carbonates with a crosslinking action without problems, which is characterized in that quaternary salts of the formula I

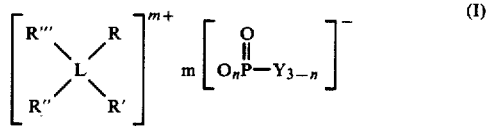

(I)

wherein

L represents N or P,

R represents H or a $C_1$–$C_6$-alkyl, $C_2$–$C_6$-hydroxyalkyl, $C_6$–$C_{10}$-cycloalkyl or $C_6$–$C_{10}$-aryl group, R', R" and R'" represent R, or at least two of these radicals together form a heterocyclic radical containing 5–10 C atoms, in which up to three C atoms can be replaced by hetero atoms, such as N, O, S and P, and in which L is part of the ring, Y represents equal or different $C_1$–$C_6$-alkoxy, $C_1$–$C_6$-thioalkyl, $C_1$–$C_6$-alkyl, aryl or aryloxy groups, n represents the number 1 or 2 and m the number 1 or 2 are used as catalysts.

It is surprising here that, for example, the salts of tertiary amines with alkylating esters of acids of phosphorus are distinctly better polymerization catalysts than the individual components of the salts used by themselves.

The catalysts used in the process according to the invention are in general reaction products of (i) alkyl phosphates or alkyl phosphonates of the formula (II)

(II)

in which R, Y and n have the meaning described for formula (I), with (ii) phosphines, amines, amides or N-heterocyclic compounds of the formula (III)

(III)

wherein

L represents N or P and

R', R" and R'" have the meaning given in the case of formula (I).

Partly or completely alkylated derivatives of phosphonic acid or phosphoric acid can be used as catalyst component (i), completely alkylated derivatives being preferred.

Examples of P compounds which are particularly suitable as catalyst component (i) are dimethyl methanephosphonate, dimethyl phosphate and dibutyl phosphate.

The catalyst components (ii) are P- and N-containing organic compounds, for example primary, secondary and tertiary amines and phosphines, amides and N-heterocyclic compounds. Typical examples of N compounds suitable as catalyst component (ii) are ammonia, diethylamine, triethylamine, dibutylamine, N,N-dimethylcyclohexylamine, dimethylbenzylamine, urea, melamine, N-methylimidazole, N-methylpyrrole, hydrazine, triethylenediamine, hexamethylenetetramine, morpholine, N-methylmorpholine, 1,5-diazabicyclo[3,4,0]-non-5-ene, 1,8-diazabicyclo[5,4,0]-undec-7-ene, diazabicylcooctane, hexamethylene-1,6-diamine, mono-, di- and triethanolamine, ethylenediamine, pyridine and 1,4-diaminocyclohexane, and a typical example of a suitable P compound is tri-n-butylphosphine.

Linear and cyclic compounds with one or more amino, imino, epimino or nitrilo groups can in principle be used as catalyst component (ii).

The catalysts which can be used according to the invention are prepared by known processes (for example Houben-Weyl, Volume XII/2, page 262 et seq), by reaction of component (i) and (ii) mentioned as examples with or without a solvent at temperatures of 100° to 200° C. It may be advantageous here to carry out the reaction under an inter gas and/or pressure.

Particularly preferred examples of catalysts which can be used according to the invention are:

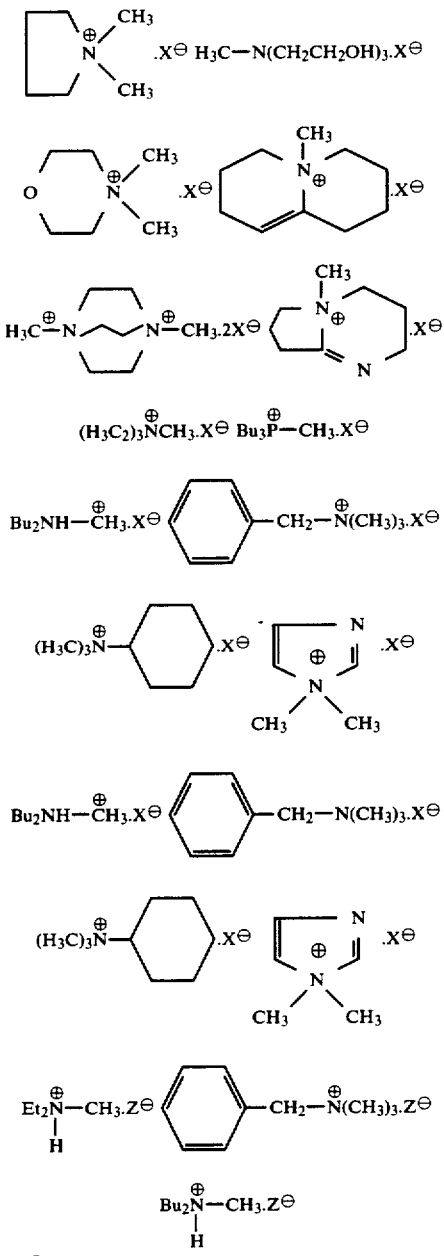

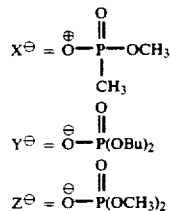

The preparation of the ammonium and phosphonium compounds used and their use for the trimerization of isocyanates and as PU activators is described in DE-OS (German Published Specification) Nos. 3,227,489 and 3,328,661.

The usability of a trimerization catalyst for isocyanates as a polymerization catalyst for cyclic carbonates was not to be expected, since the compounds epoxide/amine, oxalic acid, ethylene carbonate and Friedel-Crafts catalysts also used, for example, as trimerization catalysts (J. H. Saunders, K. C. Frisch, "Polyurethanes Chemistry and Technology", page 94 et seq (1962); and Adv. in Catalysis 13 (1962) 393) cannot be used for the polymerization of cyclic carbonates.

The catalysts used are preferably employed in bulk in the process according to the invention. They are used in amounts of 0.001-5% by weight (based on the weight of the total monomer mixture); preferably 0.005-3% by weight and particularly preferably 0.01-1% by weight.

The temperatures at which the catalyst systems are employed for the process according to the invention for ring-opening copolymerization of monocyclic carbonates with bifunctional cyclic carbonic acid esters are 50° to 200° C., preferably 100° to 170° C. and particularly preferably 120° to 160° C.

Examples of monocyclic carbonates which can be employed in the ring-opening copolymerization are: carbonates of the general formula (IV).

wherein $R^1$ denotes $(CH_2)_n$, where n=3-6, $-CH_2-CH=CHCH_2-$, $-CH_2CH_2CH(CH_3)-$, $-CH_2CH_2OCH_2CH_2OCH_2CH_2-$,

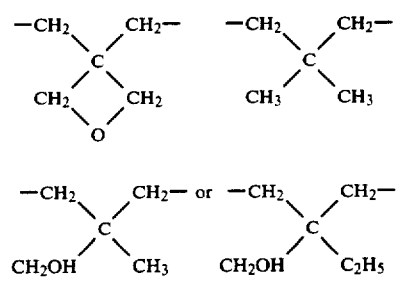

carbonates of the general formula (V)

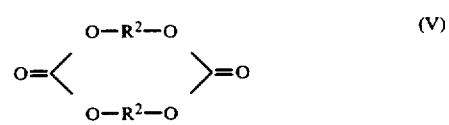

wherein $R^2$ denotes $(CH_2)_n$, where n=4-12, $-CH_2CH_2OCH_2CH_2-$, $-CH_2CH_2-O-CH_2CH_2-O-CH_2CH_2-$ or

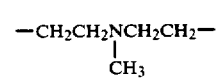

and a carbonate of the general formula (VI)

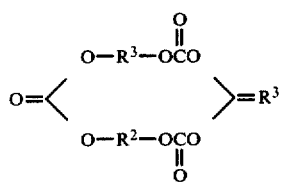

wherein $R^3$ denotes $-CH_2CH_2OCH_2CH_2-$.

The carbonates of the general formula (IV) are preferably used.

Examples of bifunctional, crosslinking cyclic carbonates which can be employed in the ring-opening polymerization are: carbonates of the general formula (VII)

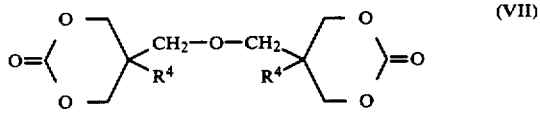

wherein $R^4$ represents an alkyl radical with 1 to 4 C atoms, carbonates of the general formula (VIII)

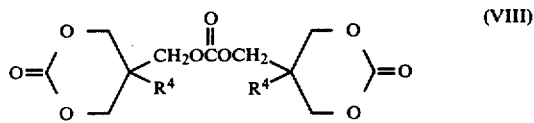

wherein $R^4$ has the meaning given in the case of formula (VIII), carbonates of the general formula (IX)

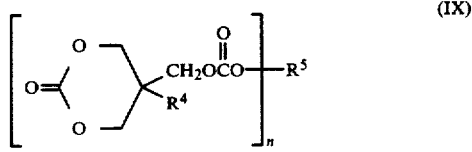

wherein
$R^4$ has the meaning given in the case of formula (VII),
$R^5$ represents an alkylidene radical with 3 to 18 C atoms, or represents an aryl radical with 6 to 12 C atoms, or represents an aralkyl radical with 7 to 24 C atoms and n represents the number 2, 3 or 4.

Carbonates of the general formula (VIII) are preferably used.

In the process according to the invention, the bifunctional crosslinking cyclic carbonates are added to the monocyclic carbonate in amounts of 2–50% by weight, preferably 5–20% by weight, based on the total amount of carbonates employed.

In the process according to the invention, the cyclic carbonates are polymerized in bulk without using solvents, by addition of the catalysts described above in the above-mentioned amounts of the abovementioned temperatures.

The process according to the invention is carried out under normal pressure, or increased pressure, preferably under normal pressure.

Use of thermosetting resins obtained by the process according to the invention is recommended in all cases where high demands are made on the typical properties of thermosetting resins which a high heat distortion point and insensitivity towards dissolving and swelling agents (for example fuels and lubricants), and furthermore where good mechanical properties, in particular high toughness, are necessary. Examples which may be mentioned are automobile components, in particular those from the area at risk from impact of stones, such as spoilers, bumper components and mudguard linings and the like.

EXAMPLES

Example 1–16

The catalyst is added in the amount shown below to a mixture of 90 parts of 5,5-dimethyl-1,3-dioxan-2-one (neopentylglycol carbonate) and 10 parts of 5,5′-(carbonyl-bis-(oxy-methylene)-bis-(5-ethyl-1,3-dioxan-2-one) (VIII) where $R^4=C_2H_5$) at a temperature of the monomer melt of 120° C. The mixture is then heated to the temperature shown below. After in each case a short time (5 to 10 minutes), the initially liquid melts solidify to clear polymers which can no longer be moulded and have a high toughness, elasticity and strength (see the table on page 12).

EXAMPLE 17

A mixture of 72 parts of neopentylglycol carbonate, 8 parts of 5,5′-(carbonyl-bis-(oxymethylene)-bis-(5-ethyl-1,3-dioxan-2-one) (VIII, where $R^4=C_2H_5$) and 0.2 part of the catalyst from Example 1 is added to 20 parts of glass fibre at a temperature of 130° C. (a polymerization temperature of 150° C. is also possible). After a short time, a clear glass fibre-reinforced polymer is obtained.

EXAMPLE 18

(Comparison with DE-OS (German Published Specification) Nos. 3,103,135 and 3,204,078, in which thallium compounds are used for the polymerization of cyclic carbonates)

A mixture of 72 parts of neopentylglycol carbonate, 8 parts of 5,5′-(carbonyl-bis-(oxymethylene)-bis-(5-ethyl-2,3-dioxan-2-one (VIII, where $R^4=C_2H_5$) and 0.2 part of thallium(I) acetate is added to 20 parts of glass fibre at 130° C. Even after reaction times >2 hours, no hardening occurs. Hardening can no longer be carried out at 150° C., because of the vigorous evolution of gas.

| Example | Catalyst prepared from | Amount used (parts) | Polymerization Temperature (°C.) |
|---|---|---|---|
| 1 | triethylamine/A | 0.1 | 150 |
| 2 | N—MeI50 | 0.08 | 150 |
| 3 | triethylamine/B | 1 | 150 |
| 4 | dimethylbenzylamine/C | 0.1 | 150 |
| 5 | dimethylbenzylamine/A | 1 | 120 |
| 6 | 4-dimethylaminoaniline/B | 1 | 150 |
| 7 | diazabicyclooctane/A | 1 | 150 |
| 8 | N—methylmorpholine/A | 0.3 | 120 |
| 9 | N—methylpyrrole/A | 0.3 | 120 |
| 10 | N,N—dimethylcyclohexylamine/A | 0.1 | 140 |
| 11 | dibutylamine/A | 1 | 150 |
| 12 | DBU⁺/A | 0.2 | 150 |
| 13 | DBN⁺⁺/A | 1 | 150 |
| 14 | diethylamine/D | 0.2 | 150 |
| 15 | dibutylamine/D | 0.2 | 150 |
| 16 | tri-n-butylphosphine/A | 1 | 150 |

⁺DBU = 1,8-diazabicyclo[5,4,0]undec-7-ene
⁺⁺DBN = 1,5-diazabicyclo[4,3,0]none-5-ene
A = dimethyl methanephosphonate
B = dibutyl phosphate
C = phosphoric acid-trimethyl (trimethyl phosphate)
D = dimethyl phosphate

We claim:

1. A process for the production of a thermosetting, unreinforced or reinforced aliphatic polycarbonate by ring-opening copolymerization comprising copolymerizing monocyclic carbonate(s) and bifunctional cyclic carbonate(s) having a cross-linking action, in which a quaternary salt of the general formula

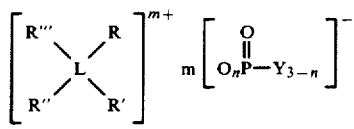 (I)

wherein
L represents nitrogen or phosphorus,
R represents a hydrogen atom or a $C_1$–$C_6$-alkyl, $C_6$–$C_{10}$-cycloalkyl or $C_6$–$C_{10}$-aryl group,
R', R" and R'" independently have the meanings given for R, or at least two of these radicals together form a heterocyclic radical containing 5–10 carbon atoms, and in which L is part of the ring,
Y represents equal or different $C_1$–$C_6$-alkoxy, $C_1$–$C_6$-thioalkyl, $C_1$–$C_6$-alkyl, aryl or aryloxy groups,
n is 1 or 2, and
m is 1 or 2
is applied as a catalyst.

2. A process according to claim 1, in which the catalyst is used in an amount of 0.005 to 3% by weight (based on the weight of total monomer mixture).

3. A process according to claim 1, in which the catalyst is used in an amount of 0.01 to 1% by weight (based on the weight of total monomer mixture).

4. A process according to claim 1 wherein at least two of R', R" and R'" together form a heterocyclic radical containing 5–10 carbon atoms in which up to three carbon atoms are replaced by a heteroatom selected from the group consisting N, O, S and P.

* * * * *

UNITED STATES PATENT AND TRADEMARK OFFICE
CERTIFICATE OF CORRECTION

PATENT NO. : 4,707,539

DATED : November 17, 1987

INVENTOR(S) : Mues et al

It is certified that error appears in the above-identified patent and that said Letters Patent is hereby corrected as shown below:

Column 6, line 22 change "on page 12)." to read --below.--;

Signed and Sealed this

Twenty-first Day of June, 1988

Attest:

DONALD J. QUIGG

*Attesting Officer*         *Commissioner of Patents and Trademarks*